United States Patent Office 3,056,781
Patented Oct. 2, 1962

3,056,781
ISOXAZOLO[4,3-d]PYRIMIDINES AND
INTERMEDIATES
Viktor Papesch, Morton Grove, Ill., assignor to G. D.
Searle & Co., Chicago, Ill., a corporation of Delaware
No Drawing. Filed Dec. 16, 1960, Ser. No. 76,132
6 Claims. (Cl. 260—249.5)

The present invention relates to a novel group of binuclear heterocyclic compounds in which one ring is a dialkyldioxotetrahydropyrimidine. More particularly, it relates to the compounds which can be represented by the following general formula

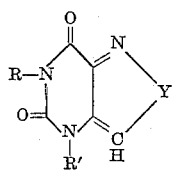

wherein R and R' are lower alkyl groups and Y can be —O— or $$-N=\overset{\uparrow}{N}-$$

In the case where Y is $$-N=\overset{\uparrow}{N}-$$

an equivalent formula is

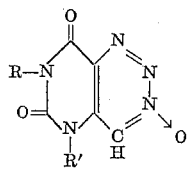

The compounds of this invention are prepared from the appropriate 1,3-dialkyl-6-methyluracils by nitration followed by catalytic reduction to yield the 1,3-dialkyl-5-amino-6-methyluracils. These reactions can be represented by the following equations:

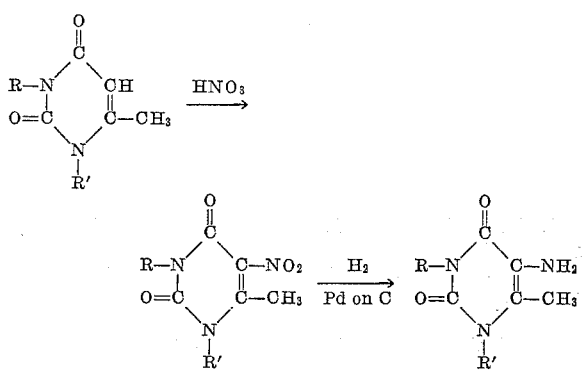

Diazotization of the amine results in ring closure to give a ring having a triazine oxide type of structure. These compounds are 5,7-dialkyl-6,8-dioxo-5,6,7,8-tetrahydro-1,2,3-triazino[5,4-d]pyrimidine-3N-oxides and can be represented by the following formula

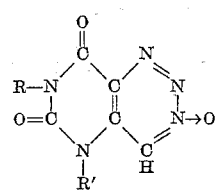

Treatment of these compounds with stannous chloride results in reduction of the triazine oxide portion of the molecule to give the corresponding 4,6-dialkyl-5,7-dioxo-4,5,6,7-tetrahydroisoxazolo[4,3-d]pyrimidine which can be represented by the formula

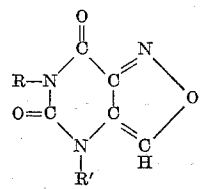

wherein R and R' are lower alkyl radicals.

The compounds of this invention possess useful pharmacological activity. Thus they are diuretics and have antiinflammatory activity. More particularly, they have a phenylbutazone-like effect on edematous conditions. They are antibacterial agents as shown by the fact that they inhibit the growth of *Diplococcus pneumoniae*. They also are inhibitors of seed germination as demonstrated by an inhibition of germination of seeds of Trifolium and of Poaceae.

The compounds which constitute this invention and the methods for their preparation will appear more fully from a consideration of the following examples, which are given for the purpose of illustration only and are not to be construed as limiting the invention in spirit or in scope. In these examples, quantities are indicated in parts by weight, temperatures are expressed in degrees centigrade (° C.), and pressures are expressed in millimeters of mercury (mm.).

*Example 1*

A mixture of 71.8 parts of concentrated sulfuric acid and 2.25 parts of fuming nitric acid is cooled to 10° C. To this solution is added with stirring 12.7 parts of 1,3,6-trimethyluracil while the temperature is maintained at 10–20° C. When solution is complete, 7.8 additional parts of fuming nitric acid is added while keeping the temperature at 10–20° C.

The solution is poured onto ice and allowed to stand for 1.5 hours. The precipitate is filtered and washed with ice water. The solid is recrystallized from 50% ethanol to give 1,3,6-trimethyl-5-nitrouracil melting at about 153–154° C.

*Example 2*

A mixture of 36 parts of 1,3,6-trimethyl-5-nitrouracil and 3.6 parts of 5% palladium on charcoal in 1000 parts of water is hydrogenated for 2 hours in a bomb at 70–99° C. and 37–50 atmospheres. The resultant solution is filtered, concentrated to 125 parts under reduced pressure, cooled, and filtered. This yields 1,3,6-trimethyl-5-aminouracil melting at about 169–171° C.

*Example 3*

A solution of 29.8 parts of 1,3,6-trimethyl-5-aminouracil in 292 parts of concentrated hydrochloric acid and 190 parts of ice is stirred and cooled to 0–5° C. 25 parts of sodium nitrite in 41.5 parts of water is clowly introduced below the surface of the amine hydrochloride solution. When the addition is complete, stirring is continued for an additional 1.5 hours and the mixture is allowed to warm to room temperature. The precipitate is filtered, washed with water and with ethanol, and dried in a vacuum dessicator to give 5,7-dimethyl-6,8-dioxo - 5,6,7,8-tetrahydro-1,2,3-triazino[5,4-d]pyrimidine-3N oxide melting at about 249–250° C. after recrystallization from acetic acid. It has the formula

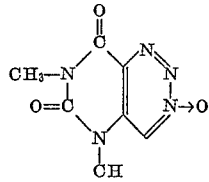

Example 4

A solution of 9 parts of stannous chloride in 35.7 parts of hydrochloric acid is filtered through diatomaceous earth. To the resultant clear solution is added 3 parts of 5,7 - dimethyl-6,8-dioxo-5,6,7,8-tetrahydro-1,2,3-triazino [5,4-d]pyrimidine-3N-oxide with cooling. The solution is stirred for 30 minutes and then chilled at 0° C. The precipitate which forms is filtered and recrystallized from methanol to give 4,6-dimethyl-5,7-dioxo-4,5,6,7-tetrahydroisoxazolo[3,4-d]pyrimidine melting at about 261–263° C. with decomposition. This compound has the following formula

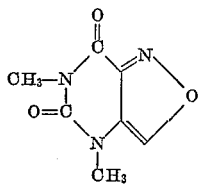

Example 5

A mixture of 59.8 parts of concentrated sulfuric acid and 3 parts of fuming nitric acid is cooled in an ice bath. To this solution is slowly added with stirring 12.5 parts of finely powdered 1,3-diethyl-6-methyluracil while the temperature is maintained at 10–15° C. When solution is complete, 6.8 additional parts of fuming nitric acid is added while maintaining the temperature below 15° C.

The solution is poured onto ice and stirred to promote crystallization. The precipitate is filtered, washed with ice water and recrystallized from 70% ethanol to give 1,3-diethyl-5-nitro-6-methyluracil melting at about 85–86° C.

Example 6

A mixture of 27 parts of 1,3-diethyl-5-nitro-6-methyluracil and 3 parts of 5% palladium on charcoal in 800 parts of absolute ethanol is stirred at room temperature and a pressure of 34 atmospheres until no further pressure drop is noted. The resultant mixture is filtered, and the filtrate concentrated to about 80 parts under reduced pressure, cooled, and filtered to yield 1,3-diethyl-5-amino-6-methyluracil melting at about 95–96° C.

Example 7

A solution of 16.8 parts of 1,3-diethyl-5-amino-6-methyluracil in 124 parts of 10% hydrochloric acid and 98 parts of crushed ice is stirred and cooled in an ice bath. A solution of 12.1 parts of sodium nitrite in 20 parts of water is added slowly; a precipitate forms. Stirring is continued for 15 minutes after the addition is complete. The suspension is filtered and the precipitate is washed with cold water, absolute alcohol and anhydrous ether. Recrystallization from absolute alcohol yields 5,7-diethyl - 6,8-dioxo-5,6,7,8-tetrahydro-1,2,3-triazino[5,4-d]-pyrimidine-3N-oxide melting at about 244–245° C. with decomposition. It has the formula

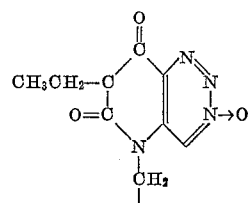

Example 8

A solution of 4.36 parts of stannous chloride in 14.5 parts of 15% hydrochloric acid is filtered through diatomaceous earth. To the filtrate is added 1.45 parts of 5,7 - diethyl - 6,8-dioxo-5,6,7,8-tetrahydro-1,2,3-triazino-[5,4-d]pyrimidine-3N-oxide at 10–15° C. with stirring. Stirring is continued for 2 hours and the mixture is allowed to warm to room temperature. The mixture is filtered and the precipitate washed with water. Recrystallization from absolute alcohol yields 4,6-diethyl-5,7 - dioxo-4,5,6,7-tetrahydroisoxazolo[4,3-d]pyrimidine melting at about 232–233° C. with decomposition. This compound has the following

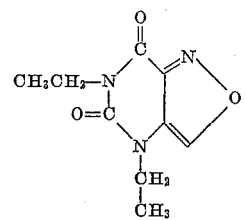

What is claimed is:
1. A compound of the formula

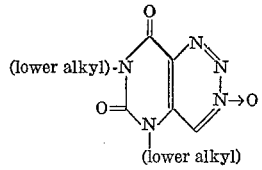

2. 5,7 - dimethyl - 6,8-dioxo-5,6,7,8-tetrahydro-1,2,3-triazino[5.4-d]pyrimidine-3N-oxide.
3. 5,7 - diethyl - 6,8-dioxo-5,6,7,8-tetrahydro-1,2,3-triazino[5,4-d]pyrimidine-3N-oxide.
4. A compound of the formula

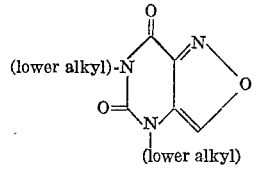

5. 4,6 - dimethyl - 5,7-dioxo-4,5,6,7-tetrahydroisoxazolo[4,3-d]pyrimidine.
6. 4,6 - diethyl - 5,7-dioxo-4,5,6,7-tetrahydroisoxazolo[4,3-d]pyrimidine.

References Cited in the file of this patent
UNITED STATES PATENTS 2,925,418   Druey et al. _____ Feb. 16, 1960

OTHER REFERENCES

Biltz et al.: Annalen der Chemie, vol. 404, page 171 (1914).
Musante: Gazz. Chim. Ital., vol. 69, page 526 (1939).
Erickson et al.: "The 1,2,3- and 1,2,4-Triazines, Tetrazines and Pentazines," page 41, Interscience Publishers, Inc., New York (1956).

UNITED STATES PATENT OFFICE
CERTIFICATE OF CORRECTION

Patent No. 3,056,781            October 2, 1962

Viktor Papesch

It is hereby certified that error appears in the above numbered patent requiring correction and that the said Letters Patent should read as corrected below.

Column 3, line 6, for "3N oxide" read -- 3N-oxide --; lines 8 to 15, for that portion of the formula reading

Column 4, lines 2 to 10, for the upper left portion of the formula reading

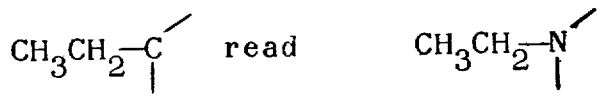

Same column 4, line 45, for "[5.4-d]pyrimidine" read -- 5,4-d]pyrimidine --.

Signed and sealed this 21st day of January 1964.

(SEAL)
Attest:
ERNEST W. SWIDER

Attesting Officer

EDWIN L. REYNOLDS

Acting Commissioner of Patents